US007585068B2

(12) United States Patent
Mullin et al.

(10) Patent No.: US 7,585,068 B2
(45) Date of Patent: Sep. 8, 2009

(54) METHOD AND APPARATUS FOR CALIBRATING GLARE-SHIELDING GLASSES

(75) Inventors: Christopher S. Mullin, Amherst, NY (US); Timothy D. Heuser, Amherst, NY (US)

(73) Assignee: Dynamic Eye, Inc., Pittsburgh, PA (US)

( * ) Notice: Subject to any disclaimer, the term of this patent is extended or adjusted under 35 U.S.C. 154(b) by 199 days.

(21) Appl. No.: 11/290,176

(22) Filed: Nov. 30, 2005

(65) Prior Publication Data

US 2006/0119785 A1 Jun. 8, 2006

Related U.S. Application Data

(60) Provisional application No. 60/632,918, filed on Dec. 3, 2004.

(51) Int. Cl.
G02C 7/10 (2006.01)
(52) U.S. Cl. .............................. 351/44; 351/45; 349/14
(58) Field of Classification Search ............... 351/44, 351/158, 200, 209, 210, 246, 45; 349/13, 349/14
See application file for complete search history.

(56) References Cited

U.S. PATENT DOCUMENTS

| 4,462,661 | A | 7/1984 | Witt |
| 4,529,873 | A | 7/1985 | Ballmer et al. |
| 4,687,072 | A | 8/1987 | Komuro |
| 4,848,890 | A | 7/1989 | Horn |
| 4,919,520 | A | 4/1990 | Okada et al. |
| 5,113,177 | A | 5/1992 | Cohen |
| 5,305,012 | A | 4/1994 | Faris |
| 5,510,609 | A | 4/1996 | Ackermann |
| 5,517,017 | A | 5/1996 | Yamada et al. |
| 5,671,035 | A | 9/1997 | Barnes |
| 5,739,880 | A | 4/1998 | Suzuki et al. |
| 5,841,507 | A * | 11/1998 | Barnes ........................ 351/49 |
| 6,244,703 | B1 * | 6/2001 | Resnikoff et al. ............. 351/44 |
| 6,636,627 | B1 | 10/2003 | Oosawa |
| 6,864,473 | B2 | 3/2005 | Chretien et al. |
| 6,992,731 | B1 | 1/2006 | Morris |
| 7,095,089 | B2 | 8/2006 | Yagi et al. |
| 7,158,199 | B2 | 1/2007 | Zhang et al. |
| 2003/0095225 | A1 | 5/2003 | Hsu et al. |
| 2003/0128355 | A1 | 7/2003 | Perkins et al. |

FOREIGN PATENT DOCUMENTS

| GB | 2137373 A | 10/1984 |
| JP | 53006057 | 1/1978 |

* cited by examiner

Primary Examiner—Huy K Mai
(74) Attorney, Agent, or Firm—Duane C. Basch; Basch & Nickerson LLP

(57) ABSTRACT

The present invention is directed to a method and apparatus for assuring that dynamic glare-shielding devices are properly characterized for the optical arrangement of a particular user by using a plurality of calibration points, thereby assuring the maximum effectiveness of such devices.

19 Claims, 8 Drawing Sheets

METHOD AND APPARATUS FOR CALIBRATING GLARE-SHIELDING GLASSES

This application claims priority from U.S. Provisional Application No. 60/632,918, by Christopher S. Mullin, for "Method and Apparatus for Calibrating Glare-shielding Sunglasses," filed Dec. 3, 2004, and is hereby incorporated by reference in its entirety.

This application is directed to a method and apparatus for calibrating glare-shielding glasses, sunglasses and similar optical shading devices, and more particularly, to a method and apparatus for assuring that such devices are properly characterized for the optical arrangement of a particular user by using a plurality of calibration points, thereby assuring the maximum effectiveness of such devices.

BACKGROUND AND SUMMARY

To protect the eyes from bright light sources, shading techniques have been applied to optical devices such as eyewear (e.g., glasses), visors, face shields (e.g., pilot helmets) and the like. Such devices may either be made from a shaded material that constantly reduces the amount of light passing therethrough, or from a material that has an alterable shading. Photosensitive lenses change the amount of light transmitted through the entire lens equally, as do some electronically driven lenses and auto-dimming rearview mirrors in cars. The present invention is directed to those devices, referred to herein as glare-shielding glasses where small sections or regions of the device may be selectively darkened (partially or completely) so as to dim glare from a user's field of view through the device without dimming the rest of the field of view.

Glare-shielding glasses are known to exist, as demonstrated by several patents, including the following, which are also hereby incorporated by reference in their entirety for their teachings:

U.S. Pat. No. 4,848,890 to Horn, for a Visor with Sun Point Blocking, which discloses the use of a liquid crystal matrix that is used to block light in response to a photosensor;

U.S. Pat. No. 5,305,012 to Faris, for an Intelligent Electro-Optical System and Method for Automatic Glare Reduction, which teaches a method and apparatus for selectively reducing the intensity of light rays propagating towards an optical element such as an eye or a camera, including glare caused by intense sources of illumination; and U.S. Pat. Nos. 5,671,035 and 5,841,507 to Barnes, for a Light Intensity Reduction Apparatus and Method, which discloses similar light-shielding devices, and the ability of a user to selectively set a light level threshold (user control switches), as well as a user set-up technique.

Glare-shielding glasses place darkened areas on each lens of the glasses between glare sources and the user's pupils. A photosensor built into the frames determines the direction of glare sources relative to the glasses, but the glasses must make assumptions about the positions of the user's pupils. As used in this disclosure, "glare-shield" and glare-shielding "glasses" or "surfaces" will be taken to mean any head-mounted optic through which the user views the scene before them, and includes those with temples that rest on or behind the ears as well as clip-on types that attach to other eyewear and visors that are held in front of the face (e.g., helmet visors, face shields and the like).

Furthermore, each user will place the glasses on their head in approximately the same place each time, but different users will wear the glasses somewhat differently, depending on the shape of their nose, the distance between their pupils, and other facial features. To shield all of the various positions where a user's eyes might be situated would require a large amount of the field of view to be blocked or darkened, which would hamper the usefulness of the device. Thus, the glasses need to be calibrated for each user, so that they only shadow the region occupied by one particular user's pupil positions.

Disclosed in embodiments herein is a method for calibrating a glare-shield comprising: measuring at least two relationships between a glare source and a glare calibration position; and using the measured relationships, determining the location of a darkened spot on the glare shield in response to a specific location of glare on a glare sensor.

Also disclosed in embodiments herein is a system for the calibration of glare-shielding glasses worn by a user, comprising: at least one glare source; a darkened region on the glare-shielding glasses; a user's eye for concurrently perceiving the glare source and the darkened region and adjusting the location of the darkened region relative to the glare source; a controller for determining at least a first and a second relationship between the location of the glare source, the darkened region on the glare-shielding glasses, and the user's eye; memory for recording the first and second positions of the glare source on a photodetector associated with the glare-shielding glasses when the darkened region occludes the glare source; and said controller further calculating and storing first and second calibration data points, and to calculate a correction factor therefrom and subsequently provide the glare-shielding glasses with the correction factor to adjust the position of the darkened region in response to detection of the glare source location on the photodetector.

DETAILED DESCRIPTION

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

Figure 11:
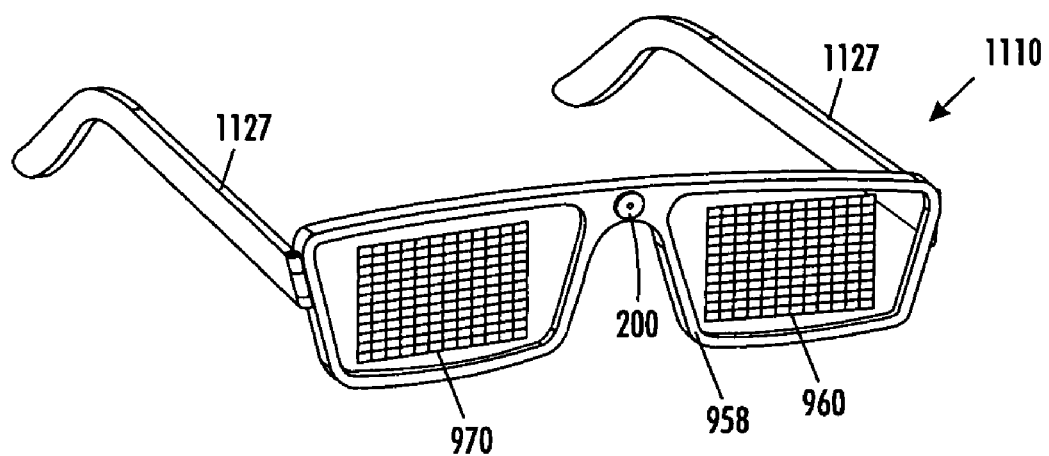
FIG. 11 is a depiction of one embodiment of glare-shielding glasses to which the described calibration procedure applies.

The following disclosure is directed to a method for calibrating glare-shielding glasses. Glare-shielding glasses are described in the patents by Horn and Barnes, an example of which is illustrated in FIG. 11. In FIG. 11, glare-shielding glasses, designated 1110, selectively reduce the intensity of light reaching the eye from specific portions of the field of view. In a general sense, glare-shielding is accomplished by placing a shield in front of each eye, 960 and 970, with an addressable matrix of pixels, which can be individually darkened to reduce or eliminate the glare. The shield is most commonly fabricated from liquid crystal materials in a manner similar to a liquid crystal display. When a bright light source, such as the sun, appears in the field of view, one or more pixels between the user's pupil and the bright light source is activated to reduce the light striking the eye from the bright light source.

One or more sensors, 200, in conjunction with control electronics incorporated into the glare-shielding glasses determine which pixels to darken. The sensors are positioned on the glasses such that light from a light source anywhere in the user's field of view strikes at least one of the sensor pixels. The electronic controls on the glasses are employed to receive signals from the photodetector, and in response to signals from the photodetector, to darken one or more pixels on the glasses. In other words the controls, often in the form of a microcontroller, and so referred to in this document, determines which shield pixels to activate based on which sensor pixels are illuminated by light exceeding a specified threshold. Shield frames, 958 and temples, 1127, hold the shields 960, 970 and sensor 200 in a fixed position relative to the eyes of the user 950.

Figure 1:
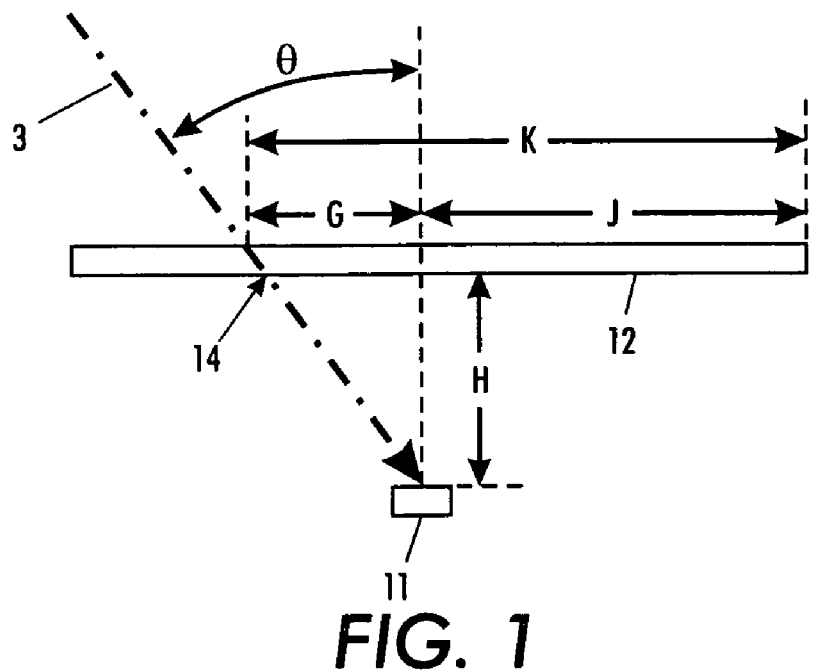
FIG. 1 is a schematic representation of a glare shield shadowing a specific shielded point.

Determining the correct three-dimensional position of the user's pupil with respect to the shield is critical when determining which shield pixels to activate when a specific sensor pixel is activated. Referring to FIG. 1, light which passes through the shield 12 at an angle $\theta$ strikes the pupil 11. The light passes through the shield 12 at a position 14 which depends on the pupil distance, H, from the shield. The dependence on pupil distance increases with the angle of incidence of the light. Although it has been suggested to account for the pupil distance by changing the size of the darkened area on the shield, it will be appreciated that the size required to shield the pupil at different pupil distances, and at all incident angles, is larger than what is required if the pupil distance is determined and accounted for in determining the optimal location of the darkened spot. Furthermore, a larger-than-necessary darkened area also blocks more of the field of view than is necessary, and thus limits the utility of the glare-shielding glasses. The present invention describes a method and apparatus for accurately determining the pupil distance and utilizing the pupil distance when determining which shield pixels to darken.

Figure 2:
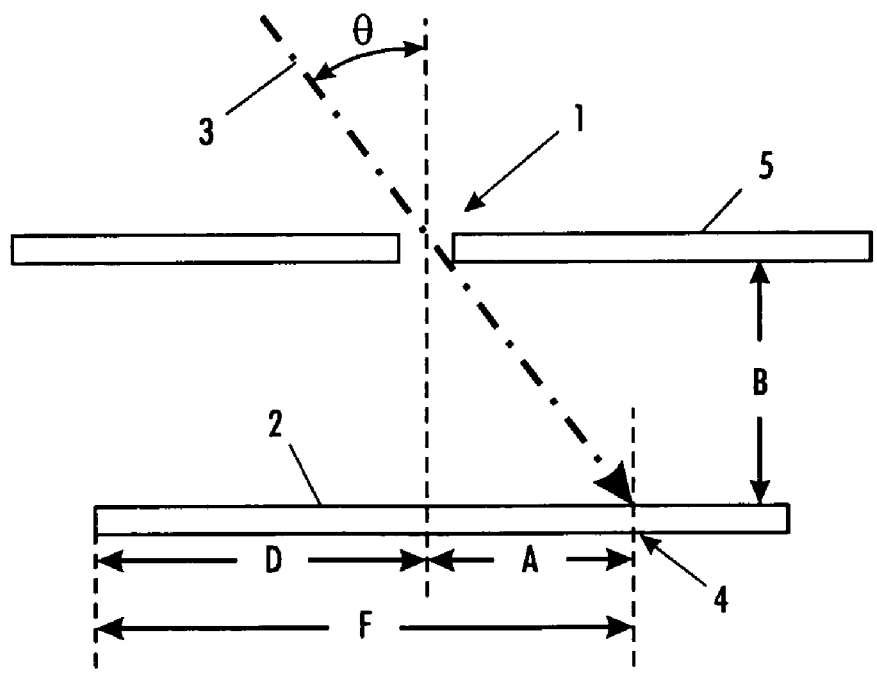
FIG. 2 is a schematic of a simple lens or pinhole camera.

The method takes advantage of the geometric similarity between a simple lens camera and the eye-glasses system. The similarity is also illustrated in FIGS. 1 and 2. FIGS. 1 and 2 illustrate the geometric similarity between a simple lens camera and a glare-shielding system. FIG. 1 is a schematic representation of the glare-shielding system showing one shielded point and one shield. FIG. 2 is a schematic of a simple lens camera, for example, a pinhole camera. A simple lens camera, exemplified by a pinhole camera, is comprised of a pinhole 1 that allows light rays through only one point in the pinhole plane 5 and a photodetector 2. The distance A from the point directly under the pinhole to the position 4 at which an incident ray 3 intersects the photodetector depends only on the angle $\theta$ of the ray and the distance of the photodetector from the pinhole plane B:

$$A = B * \tan(\theta).$$

Continuing with FIG. 1, there is depicted a glare-shielding system that seeks to shield one point in space 11 (such as a user's pupil) from incident light rays 3 using a transmissive display or glare shield 12 placed between the shielded point and the glare source. In a glasses application, the pupil would be in position 11, and one lens of the glasses would be in position 12. The distance G from the point on the shield closest to the shielded point to the "intersection position" 14, at which an incident ray 3 intersects the shield, depends only on the angle $\theta$ of the ray and the "pupil distance" of the shield from the shielded point (H):

$$G = H * \tan(\theta).$$

The relationship between the respective systems depicted in FIGS. 1 and 2 arises because the shield is analogous to the photodetector, and the shielded point is analogous to the pinhole, since all rays of interest pass through that point.

For each incident glaring light ray 3, the glare-shielding system needs to determine G when it detects a glare source at A. The system then darkens the shield segment at G in order to shield the shield point from the glare source. Clearly, $$G = H*\tan(\theta) = H*A/B = (H/B)*A. \qquad \text{Eq. 1}$$

Note that the complex trigonometric dependence on the incident angle has dropped out of the equation because of the analogy between the camera and the glareshield. Note also that the rays can be skewed (i.e. not in the plane of the figure, thereby introducing a second dimension needing to be calibrated), while the geometric relationships still hold true. This implies that the plane of the figure can be taken to be coincident with either the row or column direction of the photodetector. It also implies that the calibration techniques described herein can be carried out in two dimensions. The parameter B will be fixed by the manufacture of the pinhole camera, but the parameter H will vary from user to user, depending on the geometry of the glasses relative to their facial features and the locations of their eyes.

It is often the case that only positions relative to the edge of the sensor array F, and to the edge of the glare shield K, are known. Clearly, $$F = A + D, \text{ and}$$

$$K = G + J,$$

where D is the position of the sensor directly under the pinhole relative to the edge of the sensor, and J is the position on the glare shield closest to the shielded point, relative to the edge of the glare shield. Equation 1 still stipulates that $$K = (H/B)*F + J - (H/B)*D.$$

The quantity $J-(H/B)*D$ is composed of constants, and will be designated Q. To correctly place a darkened spot at a position K on the glare shield when a glare source is observed at a position F on the sensor array, the two quantities (H/B) and Q must be determined.

$$K = (H/B)*F + Q \qquad \text{Eq. 2}$$

Figure 3:
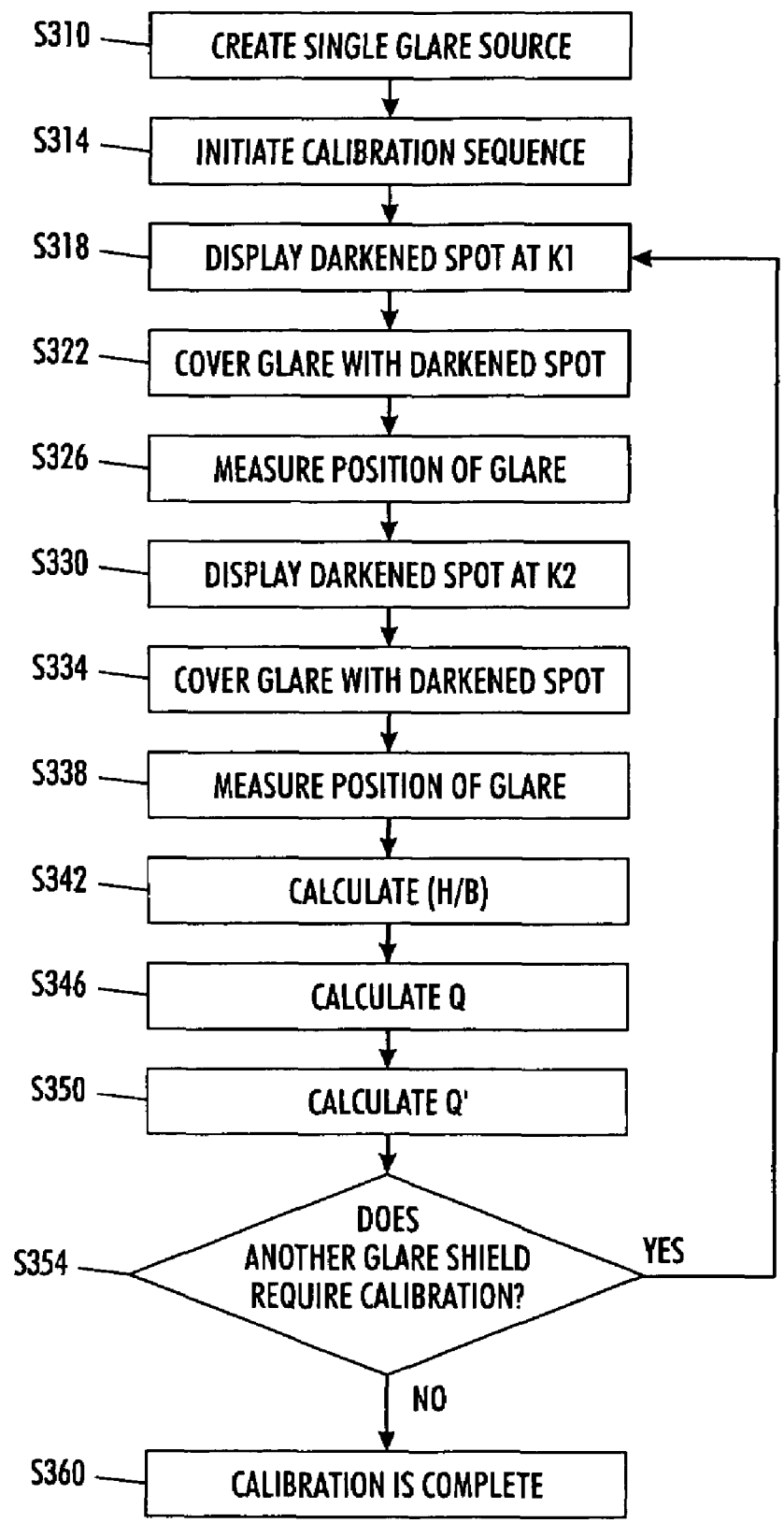
FIG. 3 is a flow chart illustrating general aspects of a method of calibration in accordance with the present invention.
Figure 4:
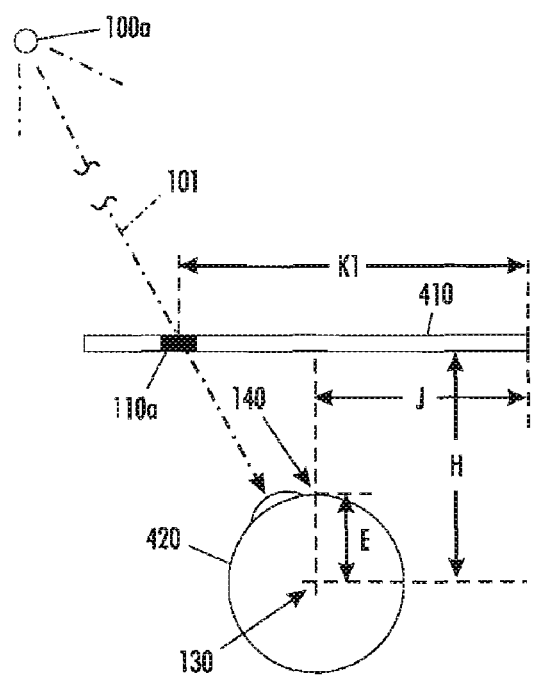
FIG. 4 is an illustrative example of an aspect of a calibration technique in accordance with the method set forth in FIG. 3.
Figure 5:
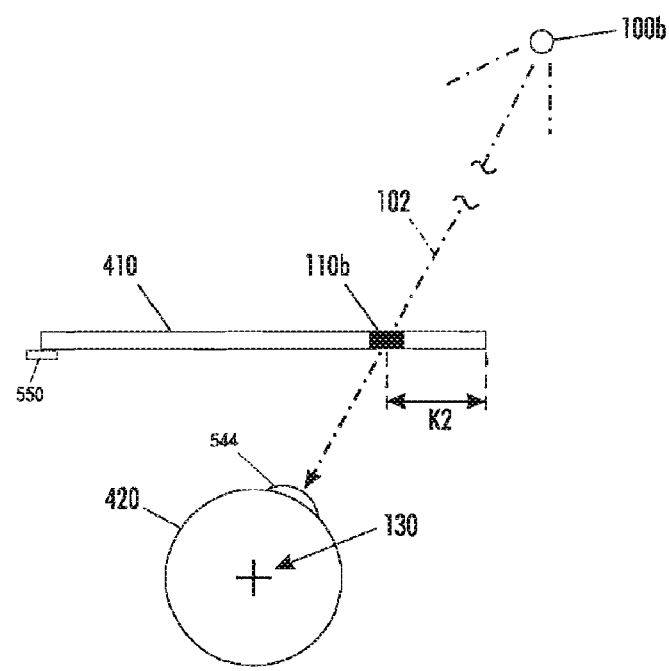
FIG. 5 is an illustrative example of another aspect of the calibration technique in accordance with the method set forth in FIG. 3.

To determine the parameters (H/B) and Q for one shield and one shielded point (for example, one glasses lens and one pupil), the following calibration procedure is performed. The general steps of the method are depicted in the flowchart in FIG. 3, and refer to the schematic diagrams of FIGS. 4 and 5. More specifically, FIG. 4 depicts elements of the first six steps of the calibration procedure, and FIG. 5 depicts aspects of the remaining steps of the calibration procedure. Together, the steps determine how to shield the position 130, termed the calibration point or position. If the user turns their eye 420 towards the glare source in each step, the calibration point will be at the center of the eyeball, denoted by the cross-hair at 130. It may be desirable to generally shield a position, termed the shielded point 140, which is offset from the calibration point. For example, position 140 at the front of the eye, 420, may be shielded by adjusting the calibration parameters using the distance E. One embodiment of the calibration method includes the following:

1) At S310 an environment is created with a first single glare source present at position 100a. The glare source(s) referenced herein could be the sun, an incandescent lamp, light emitting diodes (LEDs), infrared emitters (IREs), or other artificial light sources. Infrared emitters behave in a similar manner to light emitting diodes, but they emit electromagnetic energy in the infrared portion of the spectrum. IREs have an advantage in that their emissions are not visible to the user, but they are detectable to a silicon-based sensor, the most likely construction of the glare sensor. If made powerful enough, the IREs' emissions would serve as a glare source for calibration without being blinding to the user. It is contemplated, in one embodiment of a system for carrying out the calibration method, that an LED could be co-located or adjacent to an IRE at glare source location 100a as an indication of the glare source position for the user in the calibration procedure.

2) The calibration sequence is initiated in the glare-shielding system at S314.

3) At S318, a darkened spot 110a is displayed on a shield 410.

4) The system is altered by adjusting the relative location of the darkened spot 110a with respect to the glare source location 100a until the darkened spot lies between the glare source and the desired calibration point 130, as depicted by S322. The light ray 101 from the glare source to the calibration point 130 will then be passing through the darkened spot 110a. If the user is determining the best calibration position, then it will be advantageous for the user to be looking at the glare source at the time, as depicted in FIG. 4, since the human visual system has far better resolution at the center of the visual field than at the edge. It will be appreciated that various methods may be used to make the relative adjustment, including for example, (a) moving the darkened spot, (b) moving the position of the glare source, and/or (c) moving the position of the wearer's head on which the shield is mounted, as well as combinations of one or more of the preceding alternatives.

5) At S326, a signal is given to the glare-shielding system that a first calibration point is in position and the position can be measured and recorded. The signal could be generated in response to the user pressing a button on the system, coding a signal in the glare source, or sending a signal to a separate detector on the system (for instance, an infra-red detector, as is used in TV remote controls).

6) As part of the measurement step S326, the system also determines the position F1 of the glare source on the photodetector, and the position K1 of the darkened spot on the shield. In determining F1, it is possible that several sensor pixels on the photodetector will be excited above a threshold level, as would be the case when the glare source's light falls on a boundary between adjacent pixels. Therefore, the average position of the excited pixels should in general be calculated. It is also possible that reflections or stray light from a source, different from the intended glare source, could concurrently excite sensor pixels above the threshold, which would lead to an erroneous calculation of the average glare position. To preclude such a miscalculation, one calibration method contemplates a determination of the spread in pixel positions calculated by summing the square of the pixel positions and subtracting the square of the average pixel position. The result equals the square of the spread in pixel positions, and if the result exceeds a predetermined value, the calibration point is discarded and the calibration procedure abandoned or returns to step S318.

7) At S330, a darkened spot 110b is displayed at a second position on the shield 410.

8) The system is altered at S334, again adjusting the relative position of the darkened spot with respect to the glare source as described above, until the darkened spot lies between the glare source and the desired calibration point. The light ray 102 from the glare source 100b to the calibration point 130 will then be passing through the darkened spot 110b.

9) At S334, a signal is given to the glare-shielding system that second calibration point is complete.

10) The system determines, at S338, the position F2 of the glare source on the photodetector and the position K2 of the darkened spot on the shield. The validation step described relative to S326 can again be performed to assure a valid calibration result.

11) Next, at S342, the quantity (H/B) can then be calculated as H/B=(K1-K2)/(F1-F2).

12) Once H/B is determined, the parameter Q can be calculated as Q=K1-(H/B)*F1 at S346.

13) Since the sensor and glare shield are both two dimensional, with the second dimension perpendicular to the plane of FIG. 2, the positions determined in the steps described above will be understood to have two coordinates (the second coordinate omitted for purposes of simplicity). In the following discussion unprimed values used S342 and S346 refer to the first coordinate (in the plane of FIGS. 4 and 5), and primed values (F1', K1', F2', and K2') to refer to the second coordinate perpendicular to the plane of FIGS. 4 and 5. A calibration of the parameter Q' must also be made, and this can be done from the data already taken in steps S326 and S338, since the parameter H/B (for which two calibration points are required) is already known from S342. The parameter Q' can be calculated as $$Q'=K1'-(H/B)*F1'.$$

Alternatively, it may be more accurate to repeat steps S318-S346 using darkened spots displaced along the second dimension in order to determine Q' and an independent measurement of (H/B). It may also be more convenient to perform both calibrations at once by displacing the second darkened spot (in S330) along both the first and second dimensions from the position in S318 and arrive at two independent measurements (one in each dimension) from the two calibration points.

It will also be noted that the rays portrayed in FIGS. 4 and 5 need not be in the plane of the figure in order to accomplish the calibration. They merely need to be separated sufficiently such that F1 is not equal to F2, or else the ratio H/B calculated in S338 is undefined.

14) If an additional shield requires calibration, as determined at S354, the calibration process repeats S318 through S350 on the additional shield. For example, if steps S318 through S350 were applied to the shield protecting the right eye of the user, they would need to be repeated using the shield protecting the left eye of the user. Some simplifying assumptions might simplify the second iteration. For instance, it might be assumed that the pupil distance from the shield is equal in the two cases, in which case a single calibration point would be sufficient to calibrate the second shield.

In some embodiments, an extra procedure may be performed prior to the above calibration wherein the size of the darkened spot is adjusted according to the environment and the user so that the user can most accurately alter the system to shield the shielded point with the darkened spot. For example, a user's pupil size expands in a darkened room, so a calibration performed in a darkened room may require a larger darkened spot than a calibration performed in a brightly lit room.

Figure 9:
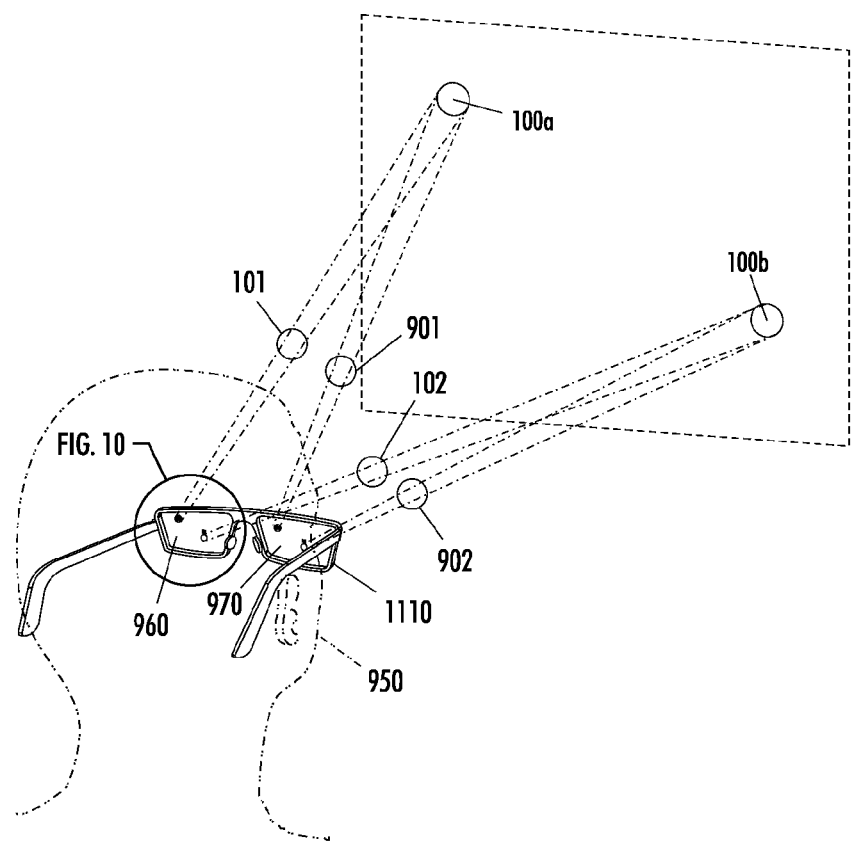
FIG. 9 is an illustration of the overall calibration set-up when applied to glare-shielding glasses.
Figure 10:
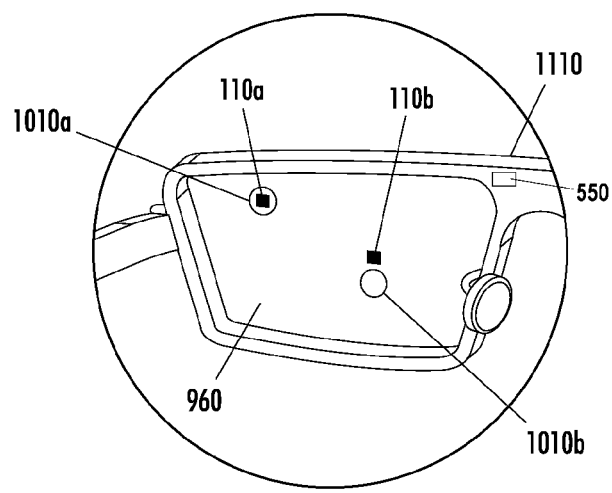
FIG. 10 is an enlarged view of the left lens shown in FIG. 9.

Referring also to FIGS. 9 and 10, the overall calibration technique is depicted in FIG. 9, and FIG. 10 depicts a close-up view of a portion of FIG. 9. Two glare positions (100a, 100b) and four calibration rays (101, 901, 102, 902) are shown in FIG. 9, but it will be appreciated that they do not occur simultaneously. The user 950 wearing the glare shielding glasses 1110 faces an area where only a single glare source is present at a time. A first glare source 100a is turned on and a first shield 960 is calibrated with a first darkened spot 110a. The relative positions are adjusted until the ray 101 from the glare source to the calibration point (depicted as circle 1010a) is intercepted by the darkened spot 110a. FIG. 10 shows the darkened spot 110a coincident with the glare location 1010a where the ray passes through the shield. After measuring the position of the first glare source on the sensor (e.g., S326 in FIG. 3), a second darkened spot 110b is displayed on the shield for calibration with a second glare source position 100b. FIG. 10 also shows the darkened spot 110b—in this case incorrectly positioned with respect to the location 1010b, where the ray passes through the shield. The relative positions are adjusted until the ray 102 from the glare source to the calibration point is intercepted by the darkened spot 110b. The position of the glare source on the sensor is then measured.

The process is repeated for the second shield 970. A first darkened spot is aligned with the ray 901 from a first position of the glare source 100a, and then a second darkened spot is aligned with the ray 902 from a second position of the glare source 100b. It should be noted that one aspect of the present invention also contemplates the change in relative glare source location from 100a to 100b due to the user modifying the position of the head and associated glare-shield sufficiently so as to provide two distinct glare source positions. Accordingly, a single, stationary glare source may suffice for the calibration. The glare sources are shown separated to emphasize the difference in positions of the two calibration points with respect to the user.

Figure 6:
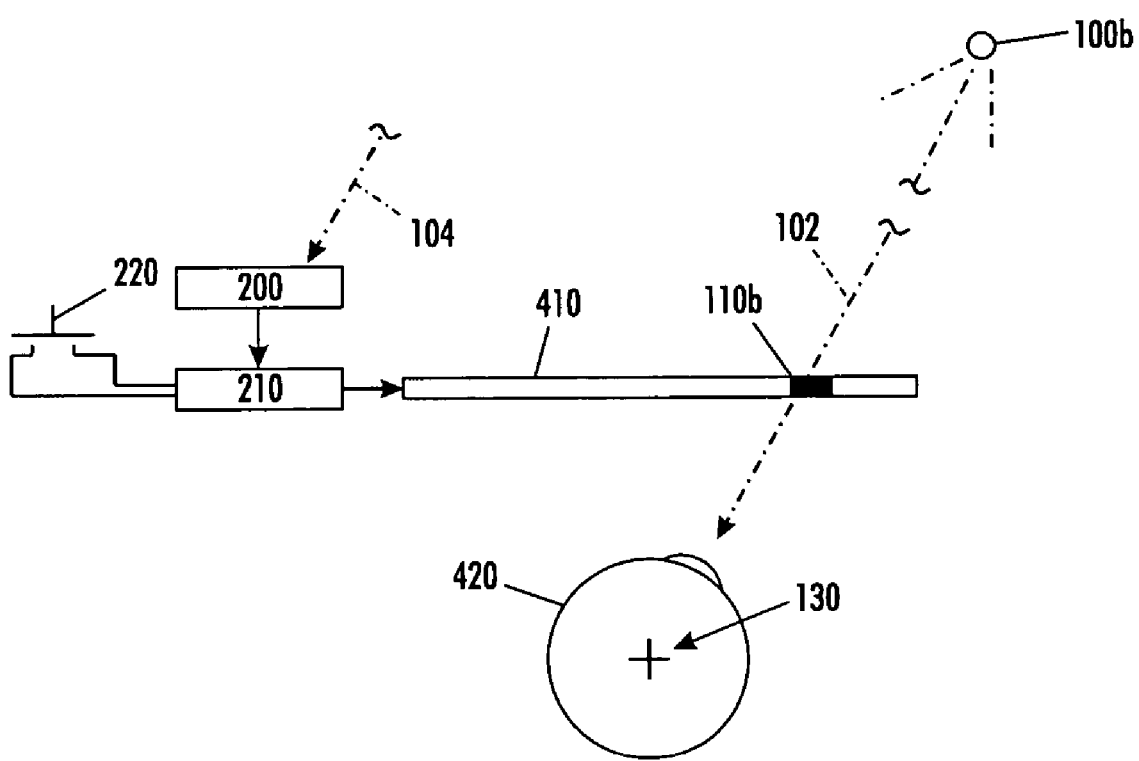
FIGS. 6-8 are illustrative embodiments of calibration systems in accordance with various alternatives of the present invention.

Several alternative embodiments are envisioned for this invention, depending on the means of signaling the glare-shielding system in steps S314, S326 and S338. In one embodiment, depicted for example in FIG. 6, a push-button contact interfaced with the microcontroller may be used,. Referring to FIG. 6, once the darkened spot 110b on the shield 410 intercepts the ray 102 traveling from the glare source 100b to the calibration point 130, a signal is given to the microcontroller 210 by pressing the button 220. The microcontroller then determines the position of the glare source by recording the ray 104 incident on the glare detector 200. Since the microcontroller positioned the darkened spot 110b on the shield, it has all the information required to do a calibration.

Figure 7:
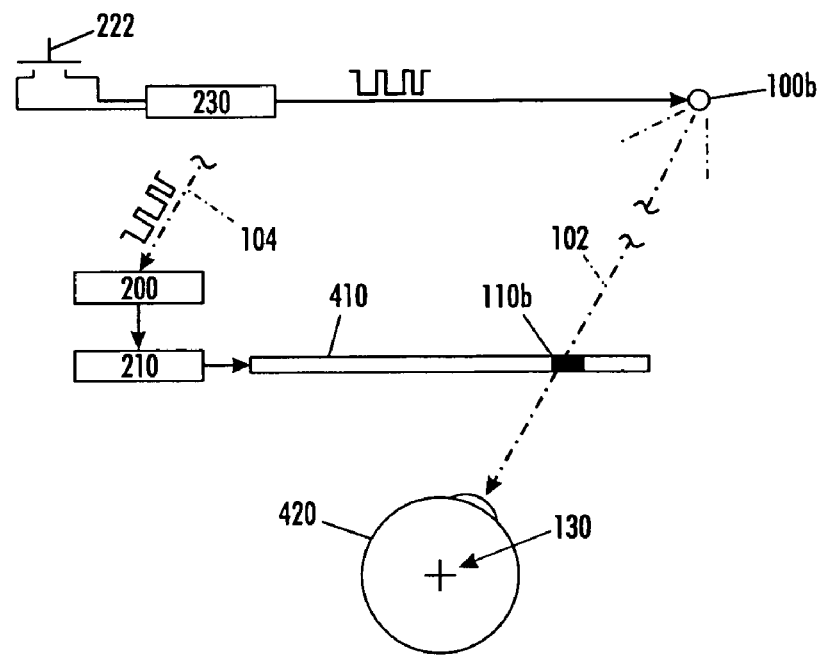

Referring to FIG. 7, which depicts an alternative embodiment, once the darkened spot 110b on the shield 410 intercepts the ray 102 traveling from the glare source 100b to the calibration point 130, a signal is given to a controller 230 of the glare source. This may be done, for example, by pressing the button 222. The glare source controller turns the glare source on and off in a sequence which is received by the glare sensor 200 and recognized by the shield microcontroller 210. The microcontroller then determines the position of the glare source by recording the ray 104 incident on the glare detector (photodetector) 200, and storing the calibration data in a memory. This system has the clear advantage of reducing the number of components in the glare shield system itself.

To distinguish a flashing calibration light source from a flashing natural light source, it will be advantageous to use a glare detection sensor or photodetector 200 suitable for producing an output that directly reflects whether a glare source is present anywhere in the field of view—in other words a "glare present" signal. Such an output would eliminate the necessity for reading out and interpreting the entire frame of data from the sensor 200. Modulation of the glare source at thousands or even millions of times per second can then be reflected in the "glare present" signal. In one embodiment, the glare detector is responsive to, and the glare source can generate, a pulsing light signal in the 100-1,000,000 cycles per second range, although it will be appreciated that a range greater than that perceptible by a human eye (e.g., 100 cycles per second) may be preferable. Since such rapid oscillation is practically impossible in a natural glare situation, it can be used to initiate and sustain communication with the glare-shielding system. The communication could be used to initiate the calibration sequence in S314, signal the glare-shielding system in S326 and S338, and ensure that the system remains in calibration mode in all the other steps of the process. The artificial glare sources believed most amenable to fast modulation are the light emitting diodes and the infrared emitters.

Figure 8:
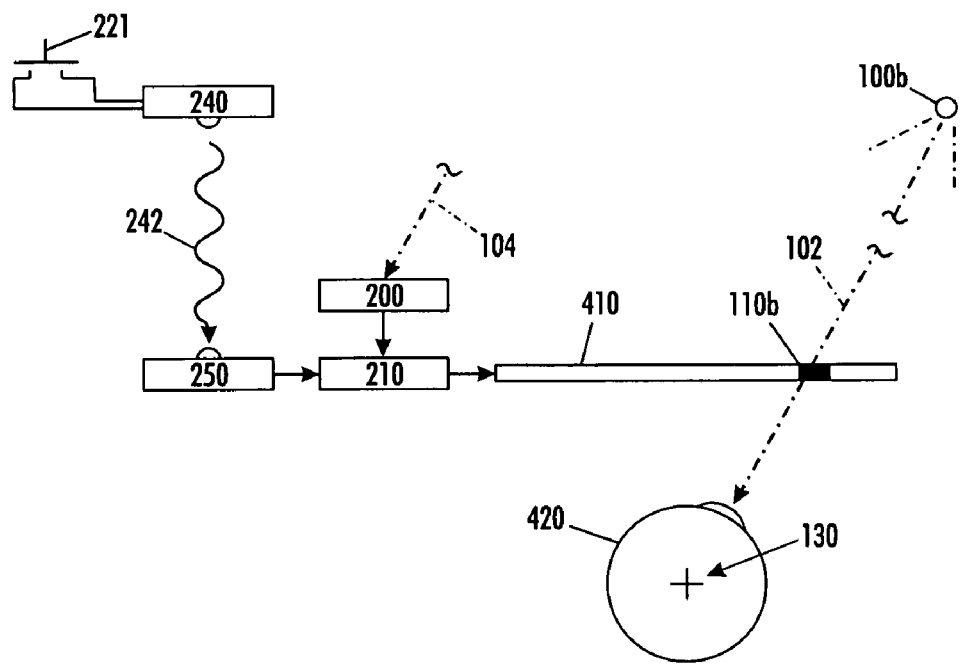

Yet another embodiment is illustrated in FIG. 8. Referring to FIG. 8, signals are transmitted to the microcontroller 210 through a separate signal receiver 250. Signals are transmitted by a signal transmitter 240 that is activated, for example, in response to a pushbutton switch 221. The form of the signal, 242, may be in one of various wavelengths, including radiofrequency, microwave, infrared, or any other means of creating a unique and timely signal. The embodiment depicted in FIG. 8 has the advantages of simplicity in the glare shield system and the signaling system without the moving parts on the glare shield system necessitated by a pushbutton, such as that depicted in FIG. 6.

Those familiar with optical devices will appreciate that the alteration of the system in steps S322 and S334 could be accomplished in any of several ways, some of which have been previously noted. For example, the user could turn their head until the darkened spot lies between the calibration point and the glare source, where the turned "orientation" is monitored by the location of the glare on the photodetector (e.g., 2, 200) of the pinhole device. Alternatively, the user's head and glasses could remain fixed, and glare source could be moved or manipulated until the darkened spot lies between the calibration point and the glare source, again using the photodetector to monitor the location of the glare source passing through the pinhole. In these first two alternatives, the position of the spot is fixed and therefore known for use in the calibration. In another embodiment, the user could interact with the glare shield system to move the darkened spot on the glare shield until the spot lies between the calibration point and the glare source, where both the position of the spot and the position of the glare source on the photodetector are employed in the calibration. Allowing the user to move their head to position the darkened spot over the glare source may be the most useful of these methods because it only requires a single, fixed-position glare source, and no extra communication with the glare-shield system. In this embodiment, the procedure would be as follows:

1) An environment is created with a single glare source present.
2) The calibration sequence is initiated in the glare-shielding system.
3) A darkened spot is displayed at a fixed position, K1, on the shield.
4) While looking at the glare source, the user turns and tilts their head to position the darkened spot over the glare source.
5) A signal is given to the glare-shielding system that a first calibration point is in position.
6) The system determines the position F1 of the glare source on the photodetector.
7) A darkened spot is displayed at a second fixed position, K2, on the shield.
8) The user turns and tilts their head to position the darkened spot over the glare source when the user is looking at the glare source.
9) A signal is given to the glare-shielding system that a second calibration point is in position.
10) The system determines the position F2 of the glare source on the photodetector.
11) The ratio H/B can then be calculated as H/B=(K1-K2)/(F1-F2).
12) The parameter Q can be calculated as Q=K1−(H/B)*(F1-D').
13) The parameter Q' can be calculated as Q'=K1'−(H/B)*(F1'-D').
14) If an additional shield requires calibration, repeat steps 3 through 13 on the additional shield.

In the above procedure, the user looks at the glare source being blocked by the calibration spot, which is advantageous because the user has the best resolution in seeing in the direction he is looking, and is thus able to position the calibration spot most accurately. However, this implies that the user is turning their eyes between the two calibration points. As a result, the point in space that is calibrated to be shaded is at the center of the user's eyeball, as illustrated by location 130 in FIGS. 4 and 5. It will often be desirable to position the shielded point at the front of the eyeball, as illustrated by location 140, so that the user's pupil is shaded when the user is looking forward. To accomplish this adjustment in calibration, the parameters must be adjusted to account for the smaller distance between the front of the eye and the shield, as compared with the center of the eye and the shield. The shielded position is closer to the shielding array by a distance E, the radius of the eyeball. For example, a typical eyeball radius for adults is 11 mm. The adjustment can be performed if the values B and D are known for the sensor from the manufacturing process or from a separate calibration procedure of the sensor. The parameters are modified as follows:

(H/B)→(H/B)−(E/B)

Q→Q+(E/B)*D

These equations also clarify the adjustment required to account for pupil movements if a pupil-tracking device 550 (also see FIG. 10) is employed. Pupil-tracking determines the position of the pupil 544 in real time, so that the shielded position could change according to the pupil position. Without pupil tracking, an approximate position of the pupil is assumed, and the darkened spot may be made large enough to cover a predetermined set of possible pupil positions. Determining the actual pupil position would enable the glare-shielding device to further minimize the area of the darkened spot on the shield and therefore decrease the interference with the desired field of view. Moving the eye will primarily change the value of J, and will also slightly change the value of H. To a first approximation, only the value Q would need to be altered, and (H/B) could be adjusted if an even more exact correction is required.

Figure 12:
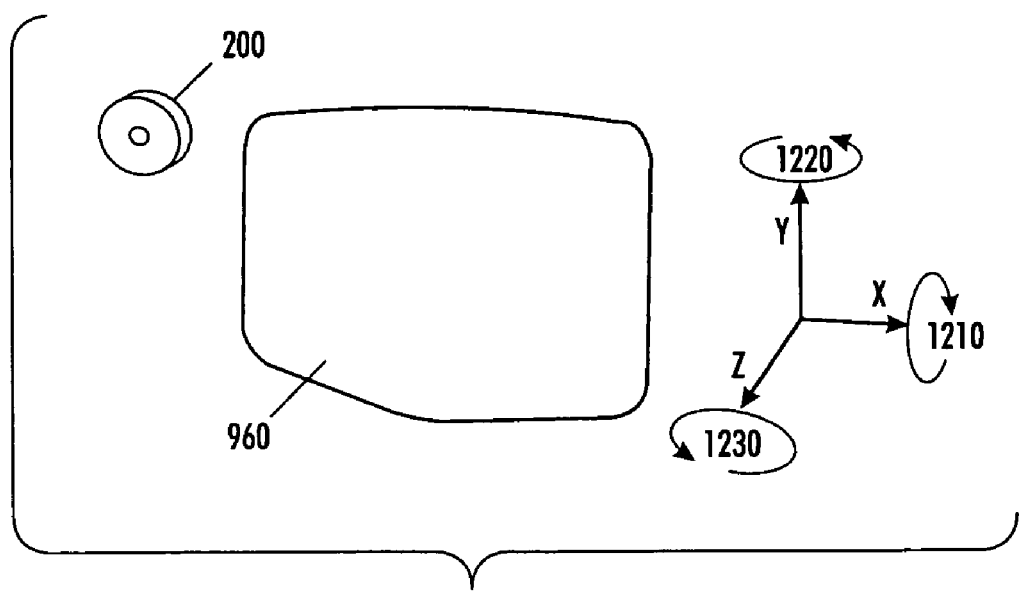
FIG. 12 is a depiction of the sensor and a planar glare shield embodiment illustrating the various rotations of the glare shield for which a calibration procedure may account.

In the case of glare-shielding glasses, some slight departures from the above-described ideal geometry are anticipated. Using coordinate axes defined by the sensor, there are three axes about which the shield (e.g., glasses lens) could be rotated with respect to the sensor, as shown in FIG. 12. FIG. 12 depicts the sensor 200 and one shield 960. Borrowing nomenclature from the field of aviation, the three rotations can be referred to as pitch (depicted as 1210, a rotation about the x-axis), yaw (depicted as 1220, a rotation about the y-axis), and roll (depicted as 1230, a rotation about the z-axis). Yaw may be the most likely departure to arise because in most glasses, the two lenses shielding the pupil may be swept back, whereas a single sensor placed above the bridge of the nose would face directly forward, thus creating a small yaw angle between the sensor plane and the shielding plane. A pitch angle could also arise from styles of glasses where the lenses are angled slightly downward instead of directly forward. Such styles are fairly common, since the shape of the human face allows a view downward to steeper angles than it does upwards, on account of the eyelids and eyebrows. Finally, roll could occur in some styles of glasses, and it could also occur during manufacturing if the sensor is not placed with an exact horizontal alignment. Thus, an embodiment of the calibration methods set forth herein would further account for all three types of rotation.

From a mathematical point of view, pitch and yaw create the same type of transformation along two different axes. Both rotations break the symmetry between the sensor and the shielding system, so that the trigonometric relationship expressed in Equation 1 does not simplify into a linear relationship. Instead, if L is the angle of the shield's yaw rotation about the y-axis, J is the distance from the edge of the shield to the shielded point parallel to the sensor plane, H is the distance from the edge of the shield to the shielded point perpendicular to the sensor plane, and K is the distance along the shield, then light incident at an angle θ intersects the shield at a position $$K = \frac{J - H*\tan(C)}{\cos(L)*[1 - \tan(L)*\tan(C)]} \quad \text{Eq. 3}$$

If L is known as a manufacturing parameter, then measuring the value of K for two different values of θ would determine the calibration values for J and H. Equation 3 could then be used to determine the correct shield spot position during normal operation.

Using Equation 3 as the determining equation may require significant computational effort, so an alternative method would be to approximate the relationship as a quadratic one, $$K = M + N*F + P*F*F \quad \text{Eq. 4}$$

and determine the three constants M, N, and P, from three calibration measurements instead of two as described above. As in Equation 2, F is the position of a glare source image on the sensor. With three pairs of values for K and F, the three constants can be solved for using linear algebra. The constants can be related back to J and H through a Taylor series expansion of Equation 3. To adjust the shielded position to a place different from the calibration position, as was done, for example, to shield the front of the eyeball instead of the center of the eyeball, the constants would be adjusted according to their relationship with J and H.

A pitch rotation about the x-axis creates a similar set of relationships for similar parameters defined regarding glare source displacements along the y-axis. The calibration for pitch and yaw could be performed separately and sequentially by first displaying three darkened calibration spots displaced along one axis and then along the other. However, it will be appreciated by one skilled in the art that the two calibration operations can be performed simultaneously by displaying a total of three darkened calibration spots displaced diagonally on the shield, and solving for Equations 3 or 4 along the two axes independently.

For a roll, or a rotation about the z-axis, the symmetry between the glare shield and the sensor is maintained, but the x- and y-axis relationships become mixed. For the small amounts of roll expected in manufacturing variations, the mixing parameters are small, and only a linear term is required. Additional calibration points are not required because the mixing will appear from the relationships between x- and y-axis measurements in the calibration steps described above. For example, if the two calibration spots used in the flowchart in FIG. 3 (at S318, S330) are separated only in the x-direction, but the measured glare positions on the sensor differ in the y-direction, then that difference is directly related to the amount of mixing between x- and y-axes, and to the amount of roll between the sensor and the shield.

Figure 13:
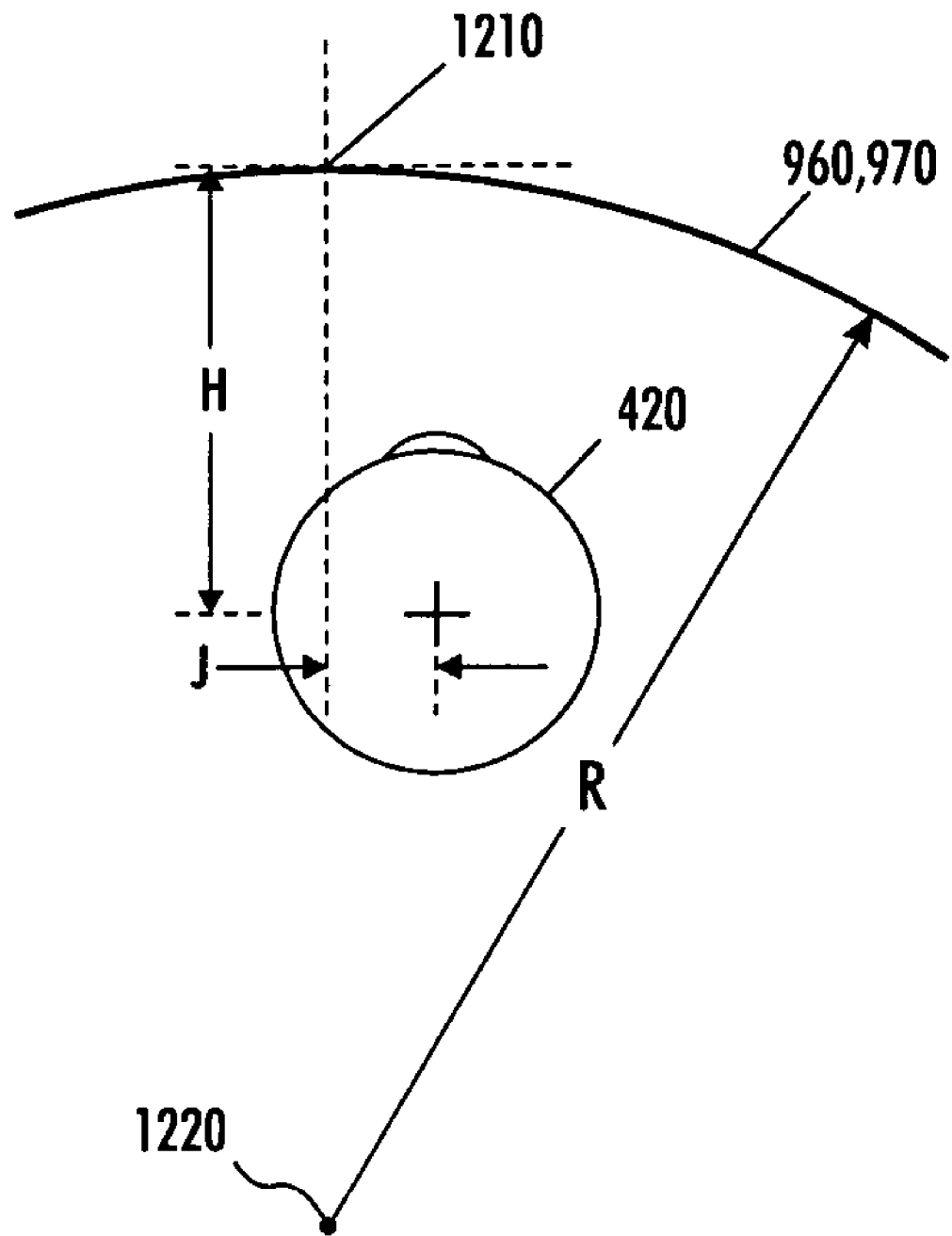
FIG. 13 is a depiction of the sensor and a non-planar glare shield embodiment illustrating the positional relationship between the calibration position and the glare shield for which a calibration procedure may account.

A more sophisticated shield may have a slight curvature in one or two dimensions to reduce distortion of the viewed scene. Today's commercial glasses, for example, use a spherical base shape, so they are curved in both the x- and y-directions. A cross-section of a curved shield is depicted in FIG. 13. The shield 960 has a center of curvature 1220 and a radius R. The front of the shield 1210 is defined as the position at which the tangent to the shield is parallel to the sensor plane. The calibration point at the center of the eye 420 is located at a position displaced from the front of the shield by H in the z-direction and J in a perpendicular direction. The mathematical relationship between the appropriate darkened position on the shield and the glare image position on the sensor is more complicated than in the cases described so far, but can still be approximated by the quadratic relationship of Equation 4. Furthermore, the parameters can be adjusted for a shift in glare shielding position away from the glare calibration position.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for calibrating a glare-shield comprising:
    measuring, using the glare shield, at least two relationships between a glare source and a glare calibration position at about the center of a user's eye, wherein measuring each relationship includes determining a relationship between the glare source, a darkened region on the glare-shield, and the calibration position, and concurrently recording the position of the glare source on a photodetector associated with the glare-shield to produce a calibration data point;
    based upon the measured relationships, determining the location of a darkened spot on the glare shield in response to a location of glare on a glare sensor; and
    tracking the position of a pupil with a pupil tracking device, wherein the measured relationships are adjusted according to the position of the pupil.

2. A method for calibrating a glare-shield comprising:
    measuring, using the glare shield, at least two relationships between a glare source and a glare calibration position, said glare calibration position located at about the center of a user's eyeball, wherein measuring each relationship includes determining a relationship between the glare source, a darkened region on the glare-shield, and the calibration position, and concurrently recording the position of the glare source on a photodetector associated with the glare-shield to produce a calibration data point, wherein recording the position of the glare source on a photodetector associated with the glare-shield includes recording a spread in pixel positions excited by the glare source, further comprising testing the validity of the calibration measurements by comparing the spread in pixel positions to a maximum allowable; and
    based upon the measured relationships, determining the location of a darkened spot on the glare shield in response to a location of glare on a glare sensor.

3. The method of claim 2, wherein a third calibration point is also used to measure the relationships between the glare source and the calibration position, and where the location of the darkened spot is calculated from a quadratic equation.

4. A method for calibrating a glare-shield comprising:
    measuring at least two relationships between a glare source and a glare calibration position; said glare calibration position located at about the center of a user's eyeball behind a pupil, including
        determining a first relationship between the glare source, a first darkened region on the glare-shield, and the glare calibration position,
        concurrently recording the first position of the glare source on a photodetector associated with the glare-shield to produce a first calibration data point,
        determining a second relationship between the glare source, a second darkened region on the glare-shield, and the glare calibration position, and
        concurrently recording the second position of the glare source on the photodetector associated with the glare-shield to produce a second calibration data point; and
        using the measured relationships, determining the location of a darkened spot on the glare shield in response to a specific location of glare on a glare sensor.

5. The method of claim 4, wherein the first darkened region is spaced apart from the second darkened region.

6. The method of claim 5, where the first and second calibration data points are stored in response to a calibration signal and wherein the calibration signal is generated in response to a coded signal.

7. The method of claim 6, wherein the coded signal is generated by the glare source.

8. The method of claim 4, wherein the first and second calibration data points are recorded as at least two-dimensional positions.

9. The method of claim 4, wherein determining the relationship comprises:
    providing a glare source at a position in front of the glare-shield;

darkening a region on the glare-shield; and adjusting the relative relationship between the darkened region and the glare source until the darkened region lies along a line between the glare source and the glare calibration position.

10. The method of claim 9, further comprising signaling a microcontroller for the glare-shield that a calibration point is complete when the darkened region lies between the glare source and the desired shielding point.

11. The method of claim 4, wherein determining the location of the darkened spot on the glare shield in response to the specific location of glare on a glare sensor comprises:

calculating a first optical ratio (H/B);

calculating a first offset parameter Q;

calculating a second offset parameter Q'; and using the optical ratio and first and second offset parameters, in conjunction with the specific location of glare on a glare sensor, to determine the location of the darkened spot.

12. The method of claim 11, wherein the optical ratio and the offset parameters are further modified to shield a position at a different distance from the glare-shield, and a distance closer to the glare shield than the glare calibration position.

13. The method of claim 4 wherein a position of the glare source is calculated as a function of a plurality of pixel positions in the photodetector detecting the glare source.

14. A system for the calibration of a glare-shield, comprising:

at least one glare source;

a darkened region on the glare-shield;

a calibration position, said calibration position approximating the center of a user's eyeball, for concurrently perceiving the glare source and the darkened region and adjusting the location of the darkened region relative to the glare source;

a microcontroller for determining at least a first and a second relationship between the location of the glare source, the darkened region on the glare-shield, and the calibration position;

memory, associated with said microcontroller, for recording first and second calibration data points for corresponding positions of the glare source on a photodetector associated with the glare-shield when, as viewed by the user's eye, the darkened region occludes the glare source, where the photodetector includes a sensor array of light-sensitive pixels located behind a pinhole aperture, such that the glare source position is indicated by pixels of the sensor array most strongly illuminated by the glare source; and said microcontroller further determining, based upon the first and second calibration data points, a position of the darkened region in response to the glare source location on the photodetector.

15. The system of claim 14, wherein said microcontroller further adjusts the location of the darkened region relative to the glare source until the darkened region lies between the glare source and the calibration position.

16. The system of claim 15, further comprising means for signaling the microcontroller for the glare-shield that a calibration point is complete.

17. The system of claim 16, wherein the means for signaling includes a signal transmitter and receiver.

18. The system of claim 16, wherein the signal is a coded signal from the glare source, and where said microcontroller monitors an on/off state of the glare source over a period of time to detect the coded signal.

19. The system of claim 16, wherein said at least one glare source includes an infrared emitter in conjunction with a low-intensity visible light source.

* * * * *